Patented May 3, 1938

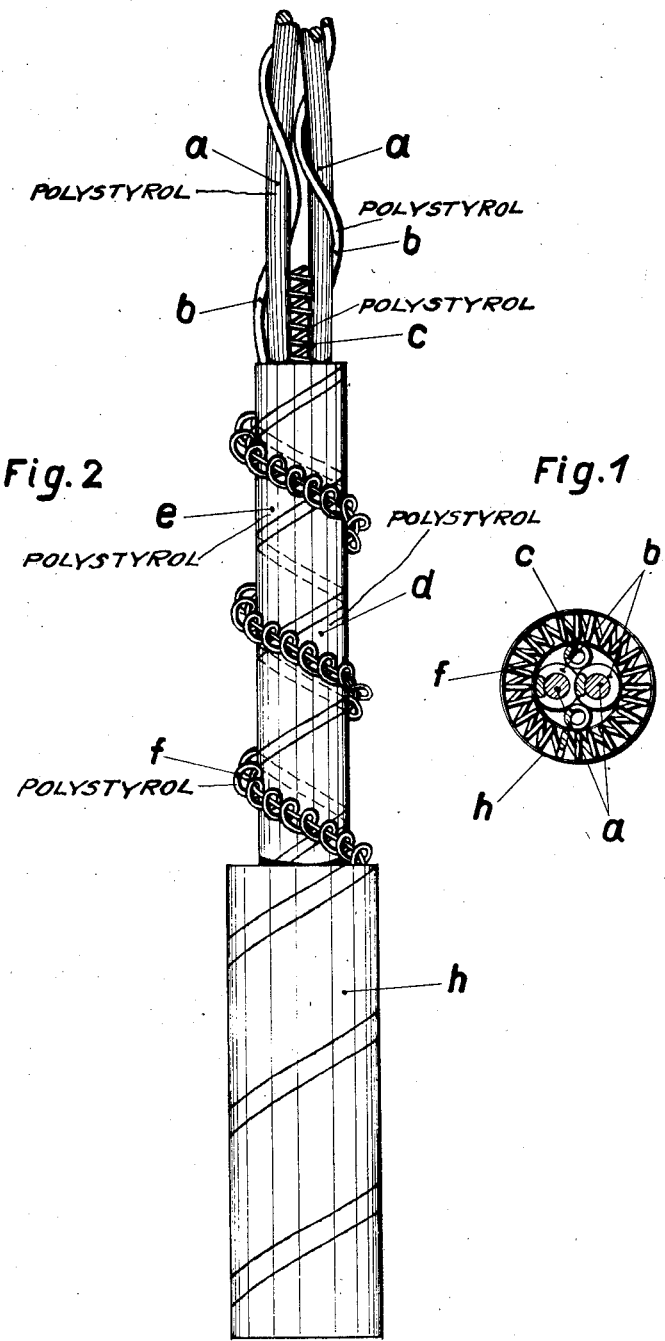

2,116,268

UNITED STATES PATENT OFFICE 2,116,268

HIGH FREQUENCY CONDUCTOR

Franz Klimmer, Berlin-Oberschoneweide, Germany, assignor to Felten & Guilleaume Carlswerk Actiengesellschaft, Cologne-Mulheim, Germany Application May 28, 1936, Serial No. 82,369
In Germany May 28, 1935

1 Claim. (Cl. 173—265)

In constructing multi-core conductors it has hitherto been usual to insulate the cores and then strand them together, so that the distance between two cores is about twice the distance from the outside covering. This construction is correct inasmuch as, for example, with a two-core cable with metallic covering, the optimum of the capacity is obtained when the distance between the conductors is about 50% of the diameter of the pair. For low frequency the capacity is the only quantity for which the construction of the insulation is of importance.

For high frequency this is not the case. Here the additional resistances due to eddy currents in the neighbouring metal parts are also influenced by the type of construction. In high frequency conductors, therefore, as is known, more favourable transmission properties are obtained if the distance between the cores is made less than 50% of the diameter of the pair because then the induced currents are smaller, and as a result the additional losses decrease to a comparatively greater extent than the increase in capacity.

Such a conductor can be made like an ordinary conductor, twisted in pairs, and the pair enclosed by a common insulating covering. According to the invention however, the cores are each first wound round in the same direction with a single cord. Then the cores are twisted together and the cords inter-engage in such a manner that the distance between the cores is only the thickness of the cord. The pair is enclosed with a common band winding which may be reinforced as required. An air space insulation of this kind has the advantage that the amount of solid material can be kept extremely small and the distance between the cores is very uniform.

Particularly good properties of the insulation are obtained when the cords and bands are made of polystyrol, which combines great mechanical strength with low di-electric constants and very low angle of loss.

In order that the conductor may have, as far as possible, a circular cross-section, it is advisable to worm the cores which are wound round with cords and twisted together. This worming is in practice carried out in the form of helices, such as are described in the American patent application 50,034, in order to keep the amount of solid material as small as possible. Also such helices can be used for the re-inforcement of the external insulating covering.

A constructional example of the invention is illustrated in the accompanying drawing, in which Fig. 1 is a cross-section and Fig. 2 is a side elevation. The two cores $a$ are each wrapped round with a cord $b$ preferably of polystyrol. In the spaces left when these conductors are twisted together, polystyrol helices $c$ are inserted and the whole is wound round with polystyrol bands $d$ and $e$. The core thus formed is separated from the outer metallic covering $h$ by a further helix $f$.

What I claim is:—

A high frequency electrical cable comprising a plurality of conductors twisted together, polystyrol threads wound helically around the individual conductors, self-supporting polystyrol helices in the worming spaces between the conductors, bands of polystyrol laid around the conductors and helices, an external sheath and self-supporting polystyrol helices wound helically around the inner structure, for spacing the sheath therefrom.

FRANZ KLIMMER.